United States Patent Office 3,468,666
Patented Sept. 23, 1969

3,468,666
COLOR PHOTOGRAPHIC SILVER HALIDE LIGHT-SENSITIVE MATERIALS CONTAINING BIS-PYRAZOLONE COUPLERS
Keisuke Shiba and Hikoharu Hara, Kanagawa, Japan, assignors to Fuji Shashin Film Kabushiki Kaisha, Kanagawa, Japan
No Drawing. Filed May 5, 1966, Ser. No. 547,719
Int. Cl. G03c 1/40
U.S. Cl. 96—100                        6 Claims

ABSTRACT OF THE DISCLOSURE

The invention is directed to a novel magenta coupler capable of giving excellent color images when used in a light sensitive material contained in a photographic emulsion layer. The novel coupler is the reaction product of a substituted 5-pyrazolone and an aldehyde. These novel materials are almost colorless and because of their high solubility in the high boiling point solvents for the coupler, undergo virtually no agglomeration in the emulsion.

The present invention relates to color photography and more particularly to a color-photographic, light-sensitive material containing in the emulsion layer thereof a magenta coupler capable of giving excellent color images.

A color photographic light-sensitive material used in a subtractive color process has, in general, emulsion layers each containing a silver halide sensitive to blue light, green light, or red light and also a coupler capable of forming, by color development, a yellow dye, a magenta dye or a cyan dye respectively.

The coupler for such purposes is required to have such properties that it can be uniformly dispersed in the emulsion layer as fine particles thereof in a molecular form or a micelle form. It must also have spectral absorption characteristics suitable for color reproduction and be able to form a dye having a high resistance to light, heat and moisture. It must not be diffused into the adjacent layer, that is, it must have a so-called diffusion-resisting property. At present, there are used as the coupling mother nucleus of such a magenta coupler, chemical structures 5-pyrazolone nucleus, indazolone nucleus, pyrazoloquinazolone nucleus, etc., and in such a nucleus there is introduced, as a diffusion-resisting group, a long-chain alkyl group, a long-chain alkoxy group, a di-alkylphenoxy group and the like. Further, in another method, a coupler, wherein a water-soluble group, such as a sulfo group or a carboxyl group, is introduced in the molecule to improve the affinity to a hydrophilic binder, is dispersed in an emulsion as an alkali solution thereof. In still another method, a coupler is mixed in a high-boiling solvent for the coupler, such as tricresyl phosphate, the solution is emulsified and dispersed, and then the thus obtained emulsified dispersion is added to an emulsion as a dispersion of fine oil drops.

In the former case, the coupler having the sulfo group may be easily dispersed in the emulsion, but the viscosity of the emulsion is increased by the addition of the coupler. The viscosity of the emulsion is easily varied, and in particular, the addition of the coupler causes a deviation of coating thickness of the emulsion layer, in the case of applying the emulsion by a dip coating method, which hinders the production of uniform, color-photographic, light-sensitive materials.

The coupler having the carboxyl group is usually weakly dispersible in the emulsion and hence, the coupler is precipitated in a neutral or weak acid emulsion. This reduces the transparency of the color image and readily causes the formulation of spots. In the case where a 5-pyrazolone nucleus and the like is used as the coupling nucleus of a magenta coupler, since the 5-pyrazolone nucleus has considerably high hydrophilic property, the solubility of the coupler in high-boiling point solvent for coupler is low. Hence, the material is easily crystallized and this reduces the transparency of the magenta colored image of the developed color-photographic, light-sensitive material.

Therefore, an object of this invention is to provide an improved magenta coupler having no such drawbacks.

Another object of this invention is to provide a color-photographic, light-sensitive material having an improved magenta coupler incorporated in an emulsion layer thereof.

According to the present invention, the above objects have been accomplished by using a coupler prepared by the condensation reaction of:

(a) A magenta coupler shown by the general formula:

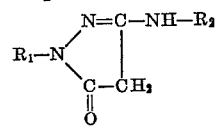

wherein $R_1$ is a substituted or unsubstituted mononuclear aryl group and $R_2$ is an acyl group, and (b) An aldehyde shown by the general formula:

$$R_3\text{—CHO}$$

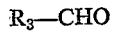

wherein $R_3$ is an alkyl group, alkylene group or a derivative thereof in an alkaline medium.

The coupler of this invention is considered to have the following chemical formula:

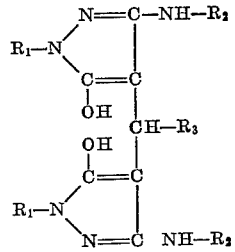

The use of the arylidene bis-pyrazolone type coupler prepared by the condensation reaction of an aromatic aldehyde and a coupler having a 5-pyrazolone nucleus has been disclosed in U.S. Patent 2,618,641. Further the use of a magenta coupler prepared by reacting an aryl aldehyde, having an auxochromous group, with a coupler having a 5-pyrazolone nucleus, as a colored coupler having an automatic masking mechanism, has also been known. However, since these couplers themselves are yellowish or yellow, they cannot be used in positive color-photographic, light-sensitive materials.

On the other hand, the above-mentioned coupler of this invention is almost colorless and hence, it can be used in positive color-photographic light-sensitive materials as well as in negative color-photographic, light-sensitive materials. Further, as shown below in Example 1, when the coupler having only one carboxyl group to the 5-pyrazolone nucleus is incorporated in an emulsion having a pH of 6.0, no precipitation of the coupler is observed. Furthermore, even with the use of the coupler having no carboxyl group, the coupler can be dispersed uniformly in the emulsion and the variation of the viscosity of the emulsion added with the coupler is less, as compared with the case of using a conventional coupler having no condensed aldehyde.

Moreover, as shown below in Example 2, the coupler of this invention has a high solubility in high boiling point solvents for the coupler. Hence, the agglomeration of the coupler in an emulsion occurs very rarely, as compared with a conventional coupler having no condensed aldehyde. That is, in the case of the water-soluble magenta coupler, the solubility of the coupler in alkaline aqueous solution is increased by the condensation of aldehyde, the hydrophilic property to a water-soluble binder is increased and also the coupler can more easily be dispersed in an emulsion. Further, in the case of a magenta coupler soluble in high boiling point solvents for the coupler, by the condensation of aldehyde, the solubility is further increased. This reduces the formation of precipitation, and the coupler can more easily be dispersed in emulsion.

Therefore, according to the present invention, the coupler can be incorporated in an emulsion in a high concentration. The thickness of the magenta coupler-containing layer of a color-photographic, light-sensitive material can be reduced, and hence, the sharpness and transparency of the magenta image can be profitably improved. Furthermore, there are such merits in the case of using the magenta coupler of this invention that the magenta coupler causes no undesirable denaturing reaction and gives few yellow stains when the color photographic light-sensitive material containing the coupler is stored for a long period of time, before or after development.

Following are examples of the synthesis of some of the magenta couplers of the invention, but it should be understood that the magenta couplers of the invention shall not be limited to them.

Preparation 1

To 20 g. of 1-phenyl-3-(3-(2-carboxymethyleicos-3-enamido)-benzamido)-5-pyrazolone was added 30 ml. of methanol to wet the pyrazolone and then the mixture was completely dissolved in 68 ml. of a 1 N aqueous sodium hydroxide solution. The solution was further mixed with 200 ml. of water and into the thus prepared solution were added 1.0 ml. of an about 80% aqueous acetaldehyde solution with stirring at about 40-50° C. After 30 minutes, 0.7 ml. of the aqueous acetaldehyde solution was added followed by stirring for about 2 hours. Thereafter, into the solution there were added sodium bisulfite to inactivate the aldehyde, hydrochloric acid to reduce the pH of the solution to about 4.0, and then Glauber's salt to precipitate the coupler. The precipitate was rinsed with water and then recrystallized using methanol to provide a coupler having a melting point of 159–161° C.

Preparation 2

To 45 g. of 1-(2,4,6-trichlorophenyl)-3-[3-[2-(2,4-di-t-amylphenoxy)acetamido]benzamido]-5-pyrazolone were added 200 ml. of methanol and 170 ml. of a 1 N aqueous sodium hydroxide solution to dissolve completely the pyrazolone. Then, after the addition of 400 ml. of methanol to the solution, 10 ml. of a methanolic solution containing about 50% phenyl acetaldehyde was added to the solution with stirring at about 40° C. After about 30 minutes, an additional 6 ml. of the methanolic solution was added, followed by reaction for 2 hours.

The product was added to water of about 10 times the amount of the product and was then mixed with sodium bisulfite to inactivate the aldehyde. It was then mixed with hydrochloric acid to precipitate crystals, which were recovered by filtration and recrystallized from methanol and water.

Preparation 3

Into 170 ml. of a 1 N aqueous sodium hydroxide solution was dissolved 50 g. of 1 phenyl-3(2-carboxymethyl.tetrades-3-enamido)-5-pyrazolone. Thereafter, the solution was completely dissolved in 670 ml. of water. While stirring the solution at about 40° C., 2.7 ml. of an aqueous solution of about 80% crotonaldehyde was added and after about 30 minutes, 2.0 ml. of the aqueous solution was added into the solution, and it was stirred for about 2 hours. Thereafter, the product was treated as in Preparation 1 to provide a crystalline product, the melting of which is 137–139° C.

Following are experiments showing the features of the couplers used in the present invention.

Experiment 1

A 5% aqueous alkali solution (1 N aqueous sodium hydroxide solution was used) of the coupler was prepared, and the solution was added to 50 ml. of an aqueous solution of 10% gelatin in an amount corresponding to $0.5 \times 10^{-3}$ mol of the coupler. After adjusting the pH of the solution to a desired value with hydrochloric acid, the solution was allowed to stand for 1 hour at 35° C. The turbidity of the solution was measured by using a photoelectric colorimeter (manufactured by Ktaki Seisaku-Sho). The results are shown in the following table.

| pH of Solution | Turbidity | | |
|---|---|---|---|
| | 6.0 | 7.0 | 8.0 |
| (a) 1-phenyl-3-[3-(2-carboxymethyl.eicos-3-enamido)-benzamido]-5-pyrazolone | Above 100 | Above 100 | 6 |
| (b) Coupler by Preparation 1 | 18 | 1 | 1 |
| (c) 1-phenyl-3-(2-carboxymethyl-tetrades-3-enamido)-5-pyrazolone | Above 100 | Above 100 | 50 |
| (d) Coupler by Preparation 3 | 35 | 15 | 10 |

Experiment 2

A definite amount of the coupler was dissolved in tricresyl phosphate at about 60° C. and the solution was allowed to stand for 6 days at room temperature. Thereafter the amount of the coupler dissolved in the tricresyl phosphate was measured. The results are as follows: That is, the amount of a conventional coupler, 1-(2,4,6-trichlorophenyl) - 3 - [3 - [2 - (2,4-di-t-amylphenoxy)acetamido]benzamido]-5-pyrazolone dissolved in 100 ml. of tricresyl phosphate was about 20 g., whereas the amount of the coupler of this invention, prepared in Preparation 2, dissolved in 100 ml. of tricresyl phosphate was more than 100 g.

The invention will be further explained referring to the following examples of this invention wherein the coupler of this invention is used practically.

Example 1

Into 100 g. of a green-sensitive silver halide emulsion was added 15 ml. of an aqueous alkaline solution of 5% of the coupler prepared in Preparation 1 or Preparation 2. After adjusting the pH of the emulsion to 6.4 with citric acid, the emulsion was coated onto a film support and dried to provide a green-sensitive, color-photographic film.

The photographic film was exposed in green light by means of an optical wedge, color developed, and then subjected to the usual fixing, bleaching, and water-rinsing treatments to provide a magenta negative image having less stain and having good transparency. The color developing solution used in the above treatment was as follows:

| | G. |
|---|---|
| N,N-diethyl-paraaminoaniline sulfate | 2.0 |
| Sodium sulfite | 2.0 |
| Sodium carbonate (monohydrate) | 50.0 |
| Hydroxylamine hydrochloride | 1.5 |
| Potassium bromide | 1.0 |
| Water to make 1 liter. | |

(pH 10.8±0.1)

Example 2

Into 10 ml. of tricresyl phosphate was dissolved 10 g. of the coupler obtained in Preparation 2. The solution was added to 100 g. of a 10% gelatin solution and, after the addition of sodium alkylbenzene sulfonate, they were mixed by means of a high-speed rotary mixer to provide an emulsified dispersion of the coupler.

The emulsified dispersion of coupler (10 g.) was added to 100 g. of a green-sensitive silver halide emulsion, and the thus prepared emulsion was coated on a film support and dried to provide a green-sensitive, color-photographic film. When the sensitometry, as in Example 1, was conducted on the thus prepared color film, a magenta negative image having good transparency was obtained.

What is claimed is:

1. A color photographic, light-sensittive material comprising a support and a light-sensitive, silver halide emulsion layer, said emulsion layer having incorporated therein, as a coupler, the condensation product of:

(a) a magenta coupler shown by the general formula:

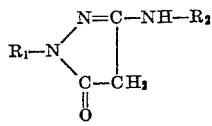

wherein $R_1$ represents a mononuclear aryl group and $R_2$ represents an acyl group, and (b) the aldehyde shown by the general formula:

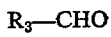

wherein $R_3$ represents a member selected from the group consisting of alkyl and alkylene groups and derivatives thereof.

2. The color-photographic, light-sensitive material as claimed in claim 1 wherein said condensation reaction of the magenta coupler and the aldehyde is carried out in an alkaline medium.

3. The color-photographic, light-sensitive material as claimed in claim 1 wherein said magenta coupler is 1-phenyl - 3-[3-(2-carboxymethyl-eicos-3-enamido) benzamido]-5-pyrazolone.

4. The color photographic light-sensitive material as claimed in claim 1 wherein said magneta coupler is 1-(2, 4,6 - trichlorophenyl) - 3 - [3-[2-(2,4 - di-t-amylphenoxy) acetamido]benzamino]-5-pyrazolone.

5. The color-photographic, light-sensitive material as claimed in claim 1 wherein said magenta coupler is 1-phenyl-3-(2 - carboxymethyltetrades - 3 - enamido)-5-pyrazolone.

6. The color photographic light-sensitive material as claimed in claim 1 wherein said aldehyde is selected from the group consisting of acetaldehyde, phenyl acetaldehyde and croton aldehyde.

References Cited

UNITED STATES PATENTS

| | | | |
|---|---|---|---|
| 2,618,641 | 11/1952 | Weissberger et al. | 96—100 |
| 2,733,143 | 1/1956 | Sprung | 96—100 |
| 2,998,312 | 8/1961 | Macdonald | 96—100 |

J. TRAVIS BROWN, Primary Examiner